April 29, 1924.
G. A. BROSIUS
LADLE STOPPER HEAD
Filed May 15, 1923
1,492,199
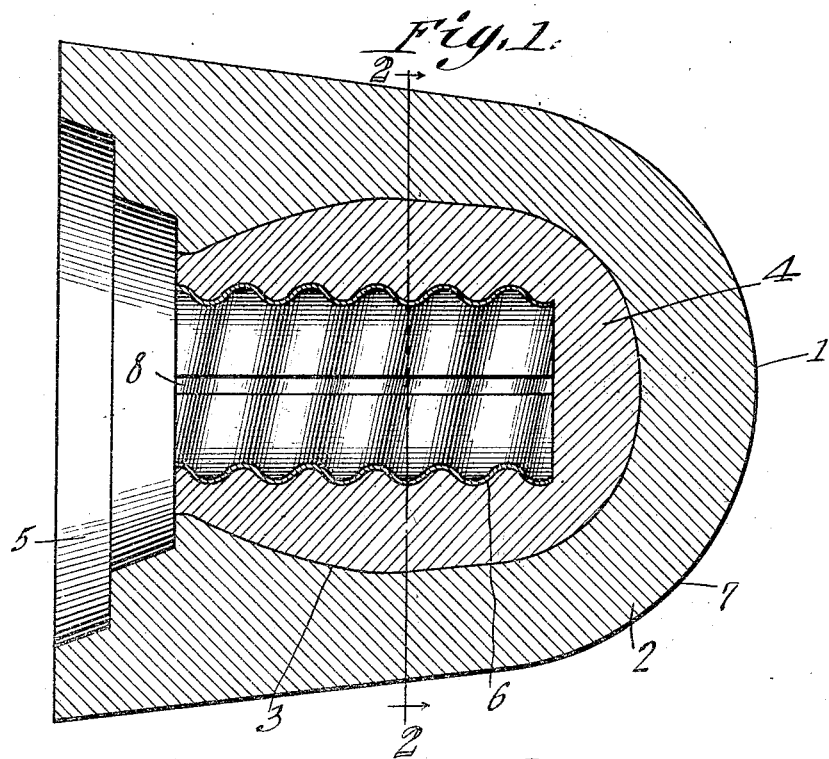
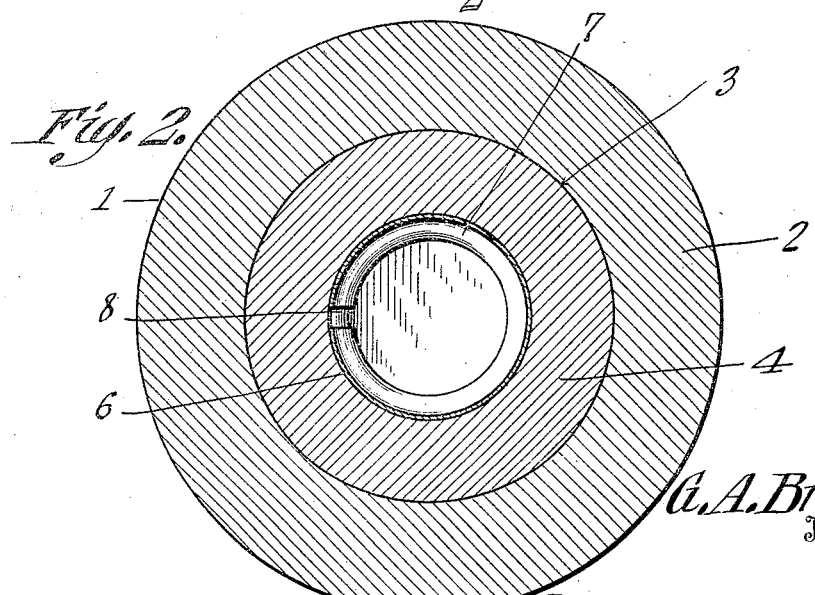
G. A. Brosius
Inventor Patented Apr. 29, 1924.

1,492,199

UNITED STATES PATENT OFFICE.

GEORGE A. BROSIUS, OF LEWISTOWN, PENNSYLVANIA.

LADLE-STOPPER HEAD.

Application filed May 15, 1923. Serial No. 639,131.

*To all whom it may concern:*

Be it known that I, GEORGE A. BROSIUS, a citizen of the United States, residing at Lewistown, in the county of Mifflin and State of Pennsylvania, have invented a new and useful Ladle-Stopper Head, of which the following is a specification.

This invention relates to stoppers for metal pouring ladles and more particularly to the heads of such stoppers.

The object of the invention is to so construct the head of a ladle stopper used in controlling the flow of molten metal from a ladle that the rod will be securely held engaged with the head, without danger of damaging the thread of the head and avoiding the consequent disconnection of the head from the rod.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed without departing from the spirit of the invention.

In the accompanying drawings:—

Figure 1 represents a longitudinal section of a stopper head embodying this invention; and Fig. 2 is a transverse section thereof taken on the line 2—2 of Figure 1.

It is the usual practice to inclose the metal rod of the stopper within a protecting shell and the lowermost section of the shell is in the form of a graphite stopper head which incloses the head of the rod. This graphite head acts as a crucible and therefore it has been found desirable to provide a clay lining or packing within the graphite outer coating. The non-conducting material which is packed into the graphite shell is preferably arranged in an opening which is undercut or larger at the base than at the top so that the clay will be confined in the graphite shell. A screw thread is molded in the clay and the rod is ordinarily screwed into the threaded opening.

The head 1 constituting this invention includes a graphite shell 2 having an opening 3 therein which is made smaller at its inner end and in which is packed a refractory material preferably fire clay shown at 4 the outer end of the shell 2 being recessed as shown at 5 to receive the sleeve brick not shown which encompasses the rod not shown.

The clay filling 4 has a threaded socket 6 formed therein the thread of which conforms to the thread on the rod.

Mounted in the threaded socket 6 is a metal lining 7 shaped to conform to the thread of the socket 6 and which is designed to prevent the thread of the steel rod from cutting into and cracking the refractory filling 4. This metal lining protects the thread of the clay filling 4 against damage so that the head may be securely retained on the rod.

This lining 7 is slotted longitudinally as shown at 8 to permit the lining to expand and contract with the graphite or clay and prevent cracking of the latter. The lining also serves as a reinforce for the head permitting a much tighter fit for the threaded stopper rod. Moreover the lining of the socket 6 with the metal lining 7 provides a stronger thread which is designed to resist the weight of the sleeve brick, not shown, which is placed around the rod to protect it from the molten metal.

While this lining 7 is shown applied to a clay lined head it may be used equally well on an all graphite head.

Various changes in the form, shape, proportion and other minor details of construction may be made without departing from the principle or sacrificing any of the advantages of the claimed invention.

I claim:—

1. A stopper head of refractory material having a threaded rod receiving socket thereon, said socket having a sheet metal lining shaped to fit the thread of the socket and extending throughout the length thereof whereby damaging of the socket thread is prevented.

2. A stopper head of refractory material having a threaded rod receiving socket thereon, said socket having a metal lining shaped to fit the thread of the socket whereby damaging of the socket thread is prevented, said lining being split longitudinally throughout its length to provide for expansion and contraction.

In testimony that I claim the foregoing as my own, I have hereto affixed my signature in the presence of two witnesses.

GEORGE A. BROSIUS.

Witnesses:
C. E. ALLISON,
FRED W. CULBERTSON.